(12) United States Patent
Sah et al.

(10) Patent No.: US 9,022,165 B2
(45) Date of Patent: May 5, 2015

(54) VEHICLE LUBRICATION FLOW CONTROL

(75) Inventors: Jy-Jen F. Sah, West Bloomfield, MI (US); Ali K. Naqvi, White Lake, MI (US); Sean W. McGrogan, Ann Arbor, MI (US); Mindy L. Barth, Farmington Hills, MI (US); Besim Demirovic, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/540,657

(22) Filed: Jul. 3, 2012

(65) Prior Publication Data

US 2014/0010668 A1 Jan. 9, 2014

(51) Int. Cl.
| | | |
|---|---|---|
| B60W 10/30 | (2006.01) | |
| B60W 30/18 | (2012.01) | |
| F16H 61/00 | (2006.01) | |
| B60R 17/02 | (2006.01) | |

(52) U.S. Cl.
CPC ............... *B60W 10/30* (2013.01); *B60R 17/02* (2013.01); *B60W 30/18* (2013.01); *B60Y 2200/92* (2013.01); *F16H 61/00* (2013.01); *F16H 61/0021* (2013.01); *F16H 2061/0037* (2013.01)

(58) Field of Classification Search
CPC . B60W 10/00; B60W 10/30; B60W 2400/00; B60W 2510/0275; B60W 2510/0283; B60W 2510/081; B60W 50/045; B60R 17/02; F16H 61/00; F16H 61/021; F16H 61/0031; F16H 61/0025; F16D 48/06; F16D 48/066; F16D 25/123; F16D 25/14; F16D 2500/70434; F16D 2500/70436; F16D 2500/7044; F16D 2500/70442; F16D 2500/70468; F16D 2500/70472; F16D 2500/7048; F16D 2500/70484
USPC ............ 180/65.265, 65.27, 65.275, 338, 339; 417/42, 43; 477/159; 701/51, 58, 60; 475/159, 161
See application file for complete search history.

(56) References Cited

U.S. PATENT DOCUMENTS

| | | | | |
|---|---|---|---|---|
| 6,537,032 | B1 * | 3/2003 | Horiuchi et al. | 417/18 |
| 7,595,600 | B2 * | 9/2009 | Patel et al. | 318/432 |
| 7,617,025 | B2 * | 11/2009 | Yamamoto et al. | 701/14 |
| 2009/0107755 | A1 * | 4/2009 | Kothari et al. | 180/339 |
| 2009/0112423 | A1 * | 4/2009 | Foster et al. | 701/60 |
| 2010/0018808 | A1 * | 1/2010 | Gloge | 184/6.12 |
| 2010/0102767 | A1 * | 4/2010 | Endo et al. | 318/453 |
| 2010/0299033 | A1 * | 11/2010 | Sah | 701/60 |
| 2011/0166727 | A1 * | 7/2011 | Light et al. | 701/22 |
| 2011/0245008 | A1 * | 10/2011 | Deutsch et al. | 475/159 |
| 2012/0072065 | A1 * | 3/2012 | Minamikawa et al. | 701/22 |
| 2012/0143422 | A1 * | 6/2012 | Kitahata et al. | 701/22 |
| 2012/0316738 | A1 * | 12/2012 | Teslak et al. | 701/53 |

\* cited by examiner

*Primary Examiner* — Jeffrey J Restifo
*Assistant Examiner* — Steve Clemmons
(74) *Attorney, Agent, or Firm* — Quinn Law Group, PLLC

(57) ABSTRACT

A method of controlling a fluid pump to supply lubricating fluid to a plurality of fluid requiring components in a hybrid vehicle powertrain includes selecting a component-required flow rate for each respective component using a determined operating speed and torque for that respective component. Once the each component-required flow rate is selected, the system flow rate is set to the maximum component-required flow rate of the plurality of component-required flow rates. The fluid pump is then commanded to supply fluid to each of the plurality of fluid requiring components at the system flow rate.

20 Claims, 2 Drawing Sheets

VEHICLE LUBRICATION FLOW CONTROL

TECHNICAL FIELD

The present invention relates to systems and methods for adjusting lubrication flow to various vehicular systems.

BACKGROUND

Within a vehicle powertrain, there can be many components that require continuous fluid lubrication to both reduce internal friction, and to cool the working components. Traditionally, such a lubricating fluid is supplied by a fluid pump that is connected with the various components using fluid conduit. Fluid pumps have been traditionally coupled with the engine and configured to pump at a multiple of the engine speed that is dictated by various gear/pulley ratios. In such a scheme, the flow rate multiple (i.e. the gear/pulley ratio) must be sized such that all components receive the required fluid flow rate when the vehicle is being operated at its harshest conditions and the engine is at its lowest speed. Under other, non-extreme circumstances, however, this sizing may result in an over-supply of fluid to the various components. Furthermore, such a scheme is not easily adapted to a hybrid gas-electric powertrain, where the gasoline engine deactivates under certain operating conditions.

SUMMARY

A hybrid vehicle powertrain includes a fraction motor, a hybrid transmission, an electric fluid pump, and a flow controller. The hybrid transmission may include a plurality of fluid requiring components, such as planetary gear sets. The electric fluid pump may be in fluid communication with a fluid reservoir and with each of the plurality of fluid requiring components. The fluid pump may be configured to supply fluid to each of the plurality of fluid requiring components at an adjustable system flow rate to optimize fluid flow in view of real-time flow demands. The fluid pump may further be in fluid communication with the traction motor, and may be configured to supply fluid to the electric motor at the system flow rate.

The flow controller may be electrically connected to the fluid pump and configured to controllably modulate the operating speed of the fluid pump to adjust the system flow rate. In this manner, the flow controller may determine an operating speed and torque for each respective fluid requiring component, and select a component-required flow rate for each respective component using the determined operating speed and torque for that component. The flow controller may then set the system flow rate at the maximum determined component-required flow rate, and may command the fluid pump to supply fluid to each of the fluid requiring components at the system flow rate.

In one configuration, the flow controller may include a plurality of two-dimensional look-up tables, and may select each component-required flow rate from one of the respective look-up tables using the determined operating speed and torque for that component.

The flow controller may be configured to determine an operating speed and torque for each respective component by sensing the speed and torque using a sensor coupled with the respective component. Alternatively, the flow controller may be configured to determine an operating speed and torque for each respective component by deriving each respective speed and torque using an operating parameter of the electric motor.

Likewise, a method of controlling a fluid pump to supply lubricating fluid to a plurality of fluid requiring components in a hybrid vehicle powertrain may include selecting a component-required flow rate for each respective component using a determined operating speed and torque for that respective component. Once the each component-required flow rate is selected, the system flow rate may then be set to the maximum component-required flow rate of the plurality of component-required flow rates. The fluid pump may subsequently be commanded to supply fluid to each of the plurality of fluid requiring components at the system flow rate.

The above features and advantages and other features and advantages of the present invention are readily apparent from the following detailed description of the best modes for carrying out the invention when taken in connection with the accompanying drawings.

DETAILED DESCRIPTION

Figure 1:
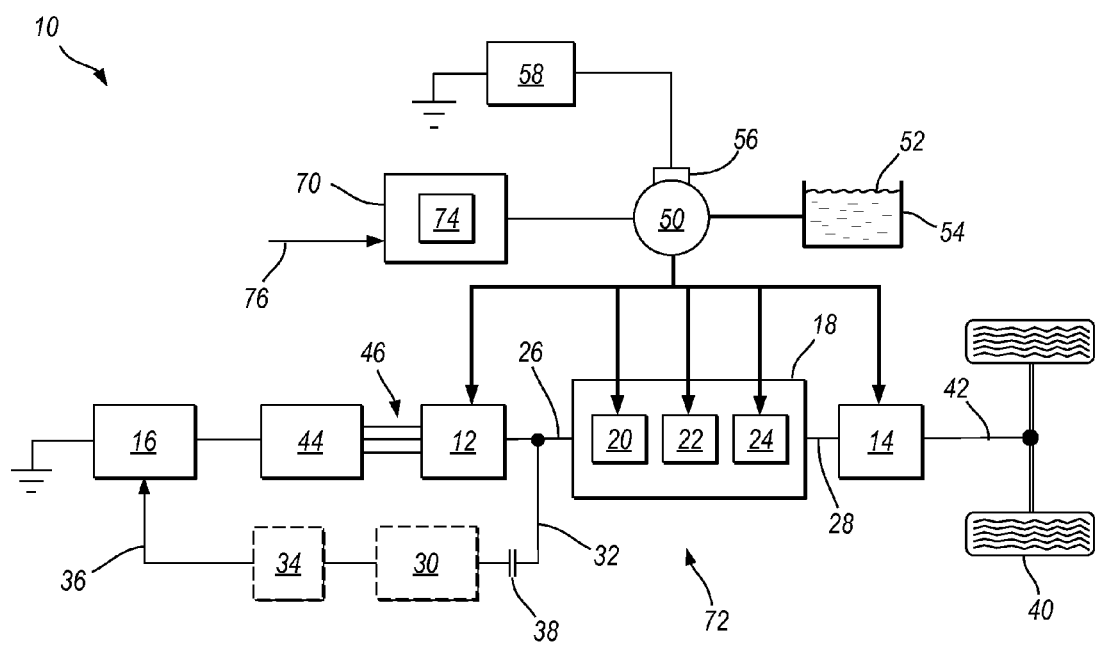
FIG. 1 is a schematic diagram of a hybrid electric vehicle including a fluid pump for supplying lubricating fluid to a plurality of components.

Referring to the drawings, wherein like reference numerals are used to identify like or identical components in the various views, FIG. 1 schematically illustrates a vehicle 10. In one configuration, the vehicle 10 may include a first traction motor 12, a second traction motor 14, and an energy storage system 16 (e.g., a battery 16). As such, the vehicle 10 may be configured as a hybrid electric vehicle (HEV), a battery electric vehicle (BEV), or an extended-range electric vehicle (EREV). Such vehicles can generate torque using one or both of the traction motors 12, 14 at levels suitable for propelling the vehicle in an electric-only (EV) mode.

In one configuration, the first and second traction motors 12, 14 may be in mechanical communication through a transmission 18 that may include a plurality of rotating gears, clutches, and other components. The transmission 18 may include, for example, a first planetary gear system 20, a second planetary gear system 22, and a third planetary gear system 24 that may selectively couple, either alone or in combination, a transmission input shaft 26 with a transmission output shaft 28. In one configuration, the transmission input shaft 26 may be selectively coupled with the first traction motor 12, and the transmission output shaft 28 may be selectively coupled with the second traction motor 14. In one configuration, the selective coupling may be accomplished through one or more friction clutches, torque converters, or other coupling devices that may be integral with the shafts 26, 28, to allow each motor to transmit/receive torque at the command of a transmission control module.

In some designs, an internal combustion engine 30, shown in phantom in FIG. 1, may be used to generate torque via an engine output shaft 32. Torque from the engine output shaft 32 can be used to either directly propel the vehicle 10, i.e., in an HEV design, or to power a generator 34, i.e., in an EREV design. The generator 34 can deliver electricity (arrow 36) to the battery 16 in a manner that may recharge the battery 16. A clutch and damping assembly 38 may be used to selectively connect/disconnect the engine 30 from a transmission 18.

Torque may be ultimately transmitted from the first and/or second traction motors 12, 14, and/or the engine 30 to a set of drive wheels 40 via an output 42 of the second traction motor 14 (and/or the transmission 18 if the second motor 14 is omitted).

Each traction motor 12, 14 may be embodied as a multi-phase permanent magnet/AC induction machine rated for approximately 60 volts to approximately 300 volts or more depending on the vehicle design. Each fraction motor 12, 14 may be electrically connected to the battery 16 via a power inverter module (PIM) 44 and a high-voltage bus bar 46 (it should be noted that the schematic depiction of the high voltage bus bar extending to the second traction motor 14 has been omitted from FIG. 1 for clarity). The PIM 44 may generally be configured for converting DC power to AC power and vice versa as needed. The battery 16 may be selectively recharged using torque from the first traction motor 12 when that traction motor 12 is actively operating as generator, e.g., by capturing energy during a regenerative braking event or when being driven by the internal combustion engine 30. In some embodiments, such as plug-in HEV (PHEV), the battery 14 can be recharged via an off-board power supply (not shown) when the vehicle 10 is idle.

The various planetary gear sets 20, 22, 24 of the transmission 18, as well as other friction clutches, bearings, or other rotating components of the transmission 18 may require an active flow of fluid lubrication during operation to reduce friction and remove generated heat. In a similar manner, each traction motor 12, 14 (and/or internal combustion engine 30, where applicable) may also require continuous fluid lubrication and cooling during operation.

An electrically-actuated/electric fluid pump 50 may be in fluid communication with the transmission 18, and/or each of the first and second traction motors 12, 14, and may be configured to supply a continuous flow of the required lubricating fluid 52 to each of the various devices. The lubricating fluid 52 may be, for example, a petroleum-based or synthetic-based engine oil, a glycol-based coolant, or some other suitably viscous, friction-reducing fluid. The fluid pump 50 may further be in fluid communication with a fluid reservoir 54 containing a reserve supply of the lubricating fluid 52. The fluid pump 50 may be driven by an electric motor 56 that may be energized either by an auxiliary battery 58 or a by separate DC-DC converter device (not shown) coupled with the primary battery 16.

A flow controller 70 may be electrically connected to the fluid pump 50, and may be configured to controllably modulate the operating speed of the electric motor 56 to thereby adjust the flow of the lubricating fluid 52 to the transmission 18, and/or each of the first and second traction motors 12, 14 (generally referred to as the "fluid requiring components 72"). The controller 70 may be embodied as one or multiple digital computers or data processing devices, having one or more microcontrollers or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, input/output (I/O) circuitry, and/or signal conditioning and buffering electronics. The controller 50 may regulate fluid flow in part by executing an algorithm 74 (i.e., a "flow control algorithm 74") that resides within the controller or is otherwise readily executable by the controller.

To conserve energy within the battery 58, it is desirable to operate the fluid pump 50 at the lowest speed that meets the fluid lubrication/cooling demands of the fluid requiring components 72. Therefore, in one configuration, the controller 70 is configured to execute the flow control algorithm 74 to estimate the real-time lubrication/cooling demands of the various components based on a plurality of real-time feedback signals 76. Execution of the algorithm 74 is described below with reference to FIGS. 2 and 3.

Once the fluid demands are estimated, the controller 50 may command the fluid pump 40 to operate at the chosen speed. Automatic speed control of the fluid pump 40 may be provided, for example, using an additively combined open-loop feedforward torque term and a closed-loop/feedback speed control torque term. As is well understood in the art, and as used herein, the control terms "feedforward" and "feedback" refer to the relationship between a controlled variable and the control system being used to monitor and control that particular variable. Closed-loop feedback control involves measuring the controlled variable, comparing it to a calibrated set point, determining the direction and magnitude of the error, and adjusting the set point in response to that error. Feedforward control attempts to adjust the setpoint(s) in response to any system disturbances before the disturbances can affect system performance to any appreciable degree. Accurate prediction of possible disturbances is thus required in advance using feedforward control, while feedback control responds to these disturbances as they occur.

Figure 2:
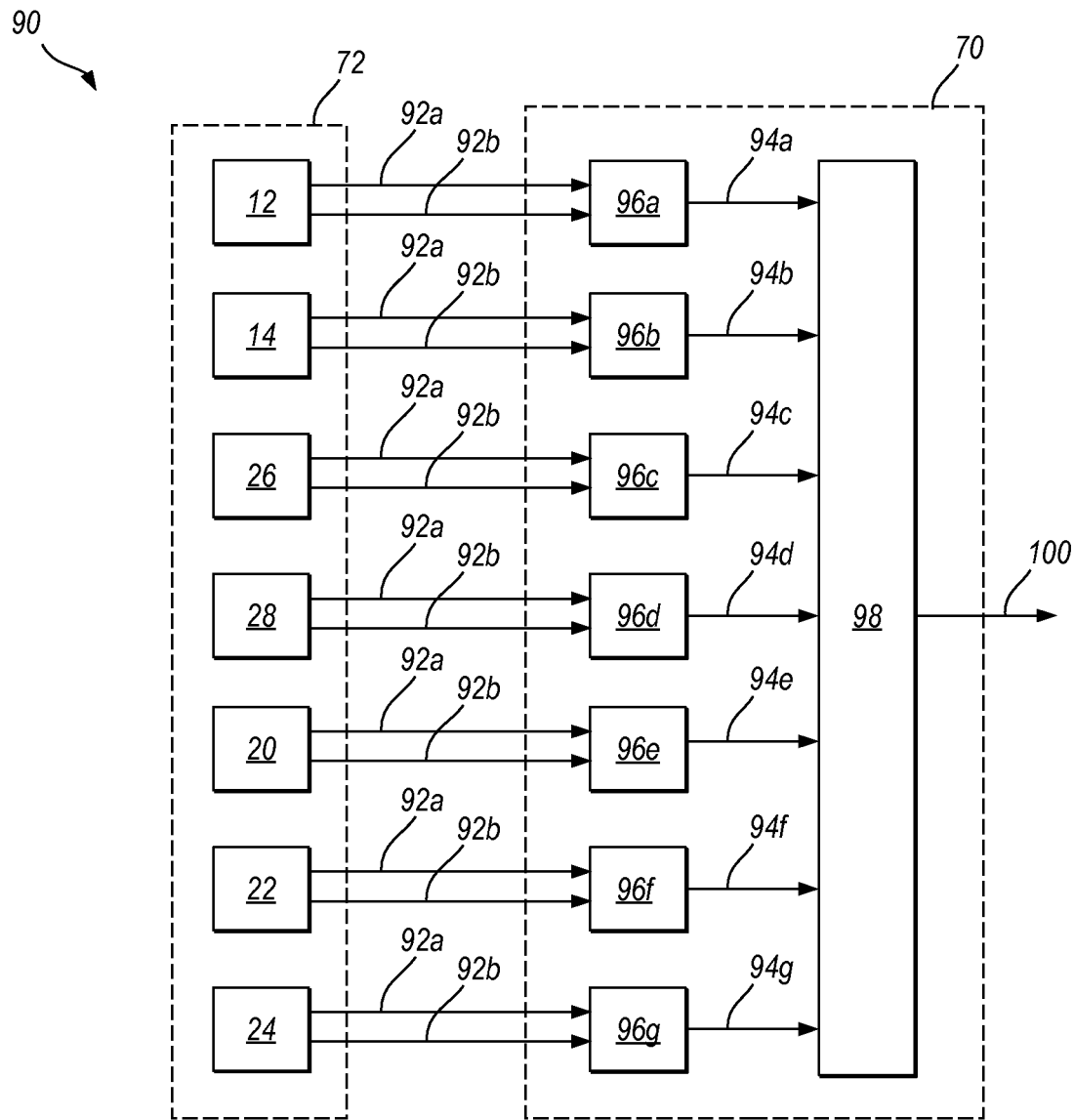
FIG. 2 is a schematic diagram of a control algorithm for outputting an optimal fluid flow command to the fluid pump of FIG. 1.
Figure 3:
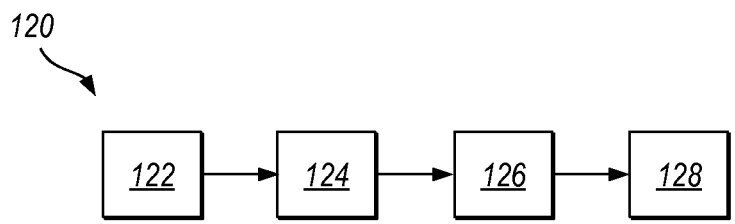
FIG. 3 is a schematic flow diagram of a method of controlling the fluid pump according to the flow control algorithm.

FIG. 2 illustrates a schematic diagram of a flow control strategy 90 embodied by the flow control algorithm 74, while FIG. 3 schematically illustrates a method 120 of controlling the fluid pump 50 according to the flow control algorithm 74. The flow control algorithm 74 schematically illustrated by FIGS. 2 and 3 considers the rotational speed and the torque of the each respective fluid requiring components 72 to arrive at an optimal fluid flow rate/pump speed. In this manner, a desired flow rate may be chosen for each respective component based on that component's power parameters. The finally commanded pump flow rate may then be the maximum flow rate of the various components. In this manner, all components that are fluidly lubricated by the single fluid pump 50 may have their lubrication demands satisfied, while excess pumping losses are minimized.

Referring specifically to FIG. 2, several of the fluid requiring components 72 are schematically illustrated as demand drivers of the flow control strategy 90. Specifically, these components may include the first traction motor 12, the second traction motor 14, the input shaft 26 (i.e., input shaft clutch 26), the output shaft 28 (i.e., output shaft clutch 28), the first planetary gear system 20, the second planetary gear system 22, and the third planetary gear system 24. Each component may have a respective speed $92a$ and torque $92b$, which may be used by the controller 70 to determine a required fluid flow rate $94a$-$94g$ for that respective component.

In the current system, it is assumed that by operating a component at a particular speed and torque, it will generate a determinable amount of heat through either friction or electrical resistance. In one configuration, the required fluid flow rate $94a$-$94g$ for each respective component may be determined such that while operating the component at the prescribed speed $92a$ and torque $92b$, the fluid flow across/through that component will result in a temperature rise of no more than a predetermined amount. For example, in one configuration, the flow rate may be chosen that results in no more than a 20 degree Celsius temperature rise in the fluid at the given operating conditions. In one configuration, the required flow rates may be determined using known thermodynamic modeling techniques, together with the dynamic efficiency of the component. In another configuration, the required flow rates may be determined using empirical testing techniques.

For quick reference during operation, the required fluid flow rates 94a-94g may be stored within the controller 70 as respective two-dimensional look-up tables 96a-96g that output a respective fluid flow rate (e.g., flow rates 94a-94g) as a function of input speed 92a and torque 92b values. During vehicle operation, the controller 70 may continuously determine the required fluid flow rates 94a-94g for each component by selecting each flow rate from the respective two-dimensional look-up tables 96a-96g.

Once the required fluid flow rates 94a-94g are determined for each respective component, the controller 70 may select the maximum required flow rate from the various component-required flow rates 94a-94g using a maximum value arbiter 98. The maximum value arbiter 98 may output then provide the maximum system flow rate 100 (selected from the various component-required flow rates 94a-94g) to the fluid pump 50 to command the desired speed.

In one configuration, each of the respective speed 92a and torque 92b parameters may be sensed using sensors coupled with the respective components. In another configuration, each of the respective speed 92a and torque 92b parameters may be inferred from, or derived from various values already available in the engine control software. For example, motor torques and speeds may be available in software, and may be based, in part, on electrical currents being supplied to the first and second traction motors 12, 14 by the PIM 44. The torque and speed of the input shaft 26 and output shaft 28 of the transmission 18 may be based on the torque load transmitted through each of the transmission input clutch and the transmission output clutch (i.e., the locked clutch torques). Such torque loads may be a function of the torque transmitting capacity of the clutch, together with the apply pressure between the clutch plates, and the load imposed on the clutch by the motors 12, 14 and inertia of the vehicle 10. Similarly, torques transmitted through the planetary gear sets may be a function of the construction of the gear sets, including the gear ratio, together with the input and output loads. In one configuration, the torque transmitted through each planetary gear sets may be a ring torque (i.e., torque through the ring gear).

FIG. 3 illustrates a method 120 of controlling the fluid pump 50 to supply a lubricating fluid 52 to a plurality of fluid-requiring components 72. The method 120 begins by determining a torque and a speed for each of the plurality of components 72 at step 122. This may include directly sensing the torque and speed for each component, or indirectly inferring the speed and/or torque from commanded or sensed speeds/torques from components that are mechanically coupled with the specific component.

Once the various speeds and torques are determined, a required fluid flow rate (e.g. flow rates 94a-94g) may be selected (step 124) for each component such that the temperature rise in the fluid, as it flows across the component, is approximately equal to a predetermined value. This may include using an analytic model of each component to approximate the entropy and/or efficiency of the component at various operating parameters. Alternatively, this may be based on empirical testing data, or embedded thermal sensors to monitor the temperature. Using the determined speed and torque variables for each component, the controller 70 may select the required flow rate for each component from a lookup table stored on-board the vehicle.

In step 126, each of the plurality of required fluid flow rates 94a-94g may be fed into a maximum value arbiter 98, where the maximum flow rate 100 of the plurality of required fluid flow rates 94a-94g may be selected and output to the fluid pump 50. In step 128, the fluid pump 50 may be controlled in a closed-loop manner to achieve the desired fluid flow rate.

In one configuration, the flow rates being output from the respective lookup tables 96a-96g may be either a numeric flow rate, or may be a flow rate coefficient. The flow-rate coefficient may dynamically scale the flow from the fluid pump 50 to a lesser value. Such a flow-rate coefficient may be expressed, for example, as a percentage of a maximum fluid flow. In this manner, the maximum flow rate 100 that is output to the fluid pump 50 may be, for example, a duty cycle that may lower the pump speed to the appropriate level.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A hybrid vehicle powertrain comprising:
a hybrid transmission having a plurality of fluid requiring components;
a fluid pump in fluid communication with a fluid reservoir and with each of the plurality of fluid requiring components, the fluid pump configured to supply fluid to each of the plurality of fluid requiring components at an adjustable system flow rate; and
a flow controller electrically connected to the fluid pump and configured to controllably modulate the operating speed of the fluid pump to adjust the system flow rate; and
wherein the flow controller is further configured to:
determine an operating speed and torque for each respective component of the plurality of fluid requiring components;
select a component-required flow rate for each respective component of the plurality of fluid requiring components using the determined operating speed and torque for that component;
set the system flow rate as the maximum component-required flow rate of the plurality of component-required flow rates; and
command the fluid pump to supply fluid to each of the plurality of fluid requiring components at the system flow rate.

2. The powertrain of claim 1, wherein the flow controller includes a plurality of two-dimensional look-up tables; and
wherein the flow controller is configured to select each component-required flow rate from a respective look-up table of the plurality of two-dimensional look-up tables using the determined operating speed and torque for that component.

3. The powertrain of claim 1, wherein the flow controller is configured to determine an operating speed and torque for each respective component by sensing the speed and torque using a sensor coupled with the respective component.

4. The powertrain of claim 1, wherein the flow controller is configured to determine an operating speed and torque for each respective component by deriving each respective speed and torque using an operating parameter of a coupled electric traction motor.

5. The powertrain of claim 1, wherein the plurality of fluid requiring components include a first planetary gear system, a second planetary gear system, and a third planetary gear system.

6. The powertrain of claim 1, wherein the fluid pump includes an electric motor.

7. The powertrain of claim 1, wherein the fluid pump is further in fluid communication with an electric fraction motor, and wherein the fluid pump configured to supply fluid to the traction motor at the system flow rate.

8. The powertrain of claim 1, wherein the component-required flow rate for each respective component is selected such that a temperature rise of the fluid across the respective component does not exceed a predetermined amount.

9. A method of controlling a fluid pump to supply lubricating fluid at a system flow rate to a plurality of fluid requiring components in a hybrid vehicle powertrain, the method comprising:
  determining an operating speed and torque for each respective component of the plurality of fluid requiring components;
  selecting a component-required flow rate for each respective component of the plurality of fluid requiring components using the determined operating speed and torque for that component;
  setting the system flow rate at the maximum component-required flow rate of the plurality of component-required flow rates; and
  commanding the fluid pump to supply fluid to each of the plurality of fluid requiring components at the system flow rate.

10. The method of claim 9, wherein selecting a component-required flow rate includes selecting the component-required flow rate from a two-dimensional look-up table using the determined operating speed and torque for that component.

11. The method of claim 9, wherein determining an operating speed and torque for each respective component includes sensing the speed and torque using a sensor coupled with the respective component.

12. The method of claim 9, wherein determining an operating speed and torque for each respective component includes deriving each respective speed and torque using an operating parameter of a coupled electric traction motor.

13. The method of claim 9, wherein the plurality of fluid requiring components include a first planetary gear system, a second planetary gear system, and a third planetary gear system.

14. The method of claim 9, further comprising supplying fluid to an electric traction motor coupled with the plurality of fluid requiring components at the system flow rate.

15. A hybrid vehicle powertrain comprising:
  an electric traction motor;
  a hybrid transmission having a plurality of fluid requiring transmission components;
  a fluid pump in fluid communication with a fluid reservoir, the traction motor, and with each of the plurality of fluid requiring components, the fluid pump configured to supply fluid to the traction motor and to each of the plurality of fluid requiring transmission components at an adjustable system flow rate; and
  a flow controller electrically connected to the fluid pump and configured to controllably modulate the operating speed of the fluid pump to adjust the system flow rate; and
  wherein the flow controller is further configured to:
    determine an operating speed and torque for the traction motor and for each respective component of the plurality of fluid requiring components;
    select a component-required flow rate for the traction motor and for each respective component of the plurality of fluid requiring components using the respectively determined operating speeds and torques;
    set the system flow rate as the maximum component-required flow rate of the plurality of component-required flow rates; and
    command the fluid pump to supply fluid to the traction motor and to each of the plurality of fluid requiring components at the system flow rate.

16. The powertrain of claim 15, wherein the flow controller includes a plurality of two-dimensional look-up tables; and
  wherein the flow controller is configured to select each component-required flow rate from a respective look-up table of the plurality of two-dimensional look-up tables using the respectively determined operating speeds and torques.

17. The powertrain of claim 15, wherein the flow controller is configured to determine an operating speed and torque for each respective fluid requiring component by sensing the speed and torque using a sensor coupled with the respective component.

18. The powertrain of claim 15, wherein the flow controller is configured to determine an operating speed and torque for each respective fluid requiring component by deriving each respective speed and torque using an operating parameter of the traction motor.

19. The powertrain of claim 15, wherein the plurality of fluid requiring components include a first planetary gear system, a second planetary gear system, and a third planetary gear system.

20. The powertrain of claim 19, wherein the respective operating torque of each of the first, second and third planetary gear systems is a ring torque.

* * * * *